United States Patent Office 3,257,421
Patented June 21, 1966

3,257,421
3-CYANO,7-OXABICYCLO[2.2.1]HEPTANE-3-CARBOXYLATES
Herbert Q. Smith, Trenton, N.J., assignor to Pennsalt Chemicals Corporation, Philadelphia, Pa., a corporation of Pennsylvania
No Drawing. Filed Jan. 22, 1963, Ser. No. 253,069
6 Claims. (Cl. 260—347.5)

This invention relates to novel cyano esters of oxabicycloheptanes and their use to control plant growth. More particularly, the invention deals with compounds of the structure

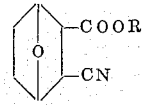

where R is a hydrocarbon radical containing from 1 to 10 carbon atoms. The invention is also concerned with the use of such compounds as plant growth regulants, particularly as herbicides which have systemic properties.

The novel compounds of the invention are prepared from the corresponding 3,6-endoxohexahydrophthalamic acid by reaction with the appropriate chloroformate and in the presence of a tertiary amine as an acid acceptor. The 3,6-endoxohexahydrophthalamic acid is readily obtained by treating one mole of 3,6-endoxohexahydrophthalic anhydride with two moles of aqueous ammonia followed by acidification of the resulting ammonium salt. The reaction is carried out in a halogenated solvent such as methylene chloride which is preferred, but other solvent systems are also useful. The reaction is exemplified by the following equation:

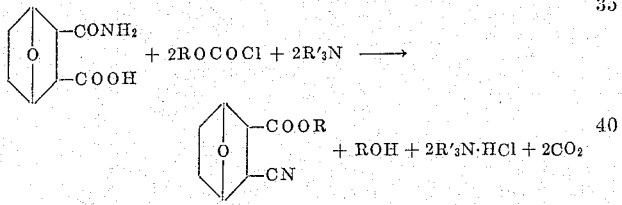

R in the above equation is a hydrocarbon radical as defined above and R' is the organic portion of the tertiary amine used as acid acceptor.

As indicated, the compounds of this invention embody those where the ester group is a hydrocarbon radical containing from 1 to 10 carbon atoms. This ester group may be aliphatic or aromatic in nature and includes methyl, ethyl, butyl, amyl, hexyl, octyl, decyl, phenyl, tolyl, xylyl, naphthyl, and the like. Thus, the chloroformate that may be used will include methyl chloroformate, ethyl chloroformate, isopropyl chloroformate, phenyl chloroformate, and the like. It will be observed from the above reaction mechanism that for each mole of the phthalamic acid there are used two moles of a chloroformate and two moles of the tertiary amine acceptor. The tertiary amine is preferably a tertiary aliphatic amine such as triethylamine, but other tertiary amines such as trimethylamine, methyldiethylamine, ethyldimethylamine, triisopropylamine, tri-n-butylamine and the like may be used. Aromatic tertiary amines such as N,N-dialkylanilines (e.g. dimethylaniline) are also useful, as are also heterocyclic amines such as pyridine.

The novel compounds of the invention are crystalline solids and melt sharply when in pure form. The esters are soluble in aliphatic and cycloaliphatic solvents such as halogenated alkanes (e.g., methylene chloride), ethanol, benzene, xylene, toluene and diacetone alcohol. The compounds are insoluble in aliphatic hydrocarbons such as hexane and the like. The compounds are further characterized by their pungent odor and by their infrared spectra which show the characteristic nitrile and ester bands.

The following examples will serve to illustrate the preparation of the compounds.

*Example 1.—Preparation of ethyl 2-cyano-7-oxabicyclo[2.2.1]heptane-3-carboxylate*

One mole of 3,6-endoxohexahydrophthalic anhydride was reacted with two moles of aqueous ammonia and hydrochloric acid added to precipitate 3,6-endoxohexahydrophthalamic acid.

To a stirred mixture of 106.5 g. (0.575 mole) of 3,6-endoxohexahydrophthalamic acid in 800 ml. of freshly distilled dry methylene chloride was added 117 g. (1.15 moles) of triethylamine held at 0° C. Then 125 g. (1.15 moles) of ethyl chloroformate at −3 to +4° C. was dropped in over a one hour period while stirring was continued. The reaction mass was allowed to stand for 16 hours at room temperature, and the solid triethylamine hydrochloride was then filtered off. The filtrate was subjected to vacuum concentration at which time more triethylamine hydrochloride precipitated and this, too, was removed by filtration. The residue was taken up in ether from which the remaining triethylamine hydrochloride was separated. Crude product of 61.7 grams was crystallized from the ether and was recrystallized from 350 ml. of a 2 to 1 hexane-benzene mixture. In this way there was obtained 51.5 g. (46% conversion) of ethyl 2-cyano-7-oxabicyclo[2.2.1]heptane-3-carboxylate which melted at 60–63° C. An analytical sample was obtained by repeated crystallization from 2 to 1 hexane-benzene which pure sample melted at 71.5 to 74° C.

Analysis for $C_{10}H_{13}NO_3$ was as follows—Calculated/found: percent C, 61.5/61.6; percent H, 6.71/6.73; percent N, 7.18/6.79.

An infrared spectrum analysis was consistent with the structure

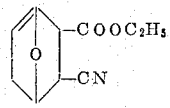

*Example 2.—Preparation of methyl 2-cyano-7-oxabicyclo[2.2.1]heptane-3-carboxylate*

To a stirred mixture of 111.0 g. (0.60 mole) of 3,6-endoxohexahydrophthalamic acid and 1300 ml. of methylene chloride was added 121.7 g. (1.20 moles) of dry triethylamine over 20 minutes with cooling to about 0° C., followed by 25 ml. of methylene chloride rinse. Then 113.5 g. (1.20 moles) of methyl chloroformate was added in the same way over about one hour at about 0° C. The mixture was stirred cold for another hour, stirred at room temperature for four hours, and left to stand overnight. The solid (102.6 g. Et₃N·HCl) was filtered off and another crop (11.4 g. Et₃N·HCl) was obtained from the filtrate. Most of the solvent was removed by distillation on the steam bath with vacuum applied toward the end. The residual cake (165.1 g.) was taken up in 500 ml. of hot benzene. The insoluble remaining triethylamine hydrochloride was filtered off and the product crystallized from the benzene filtrate. Additional material was obtained by concentration of the benzene solution. A total of 87.8 g. (81% conversion) of product was obtained, mostly of M.P. 95–97° C.

Analysis of a sample recrystallized from benzene was as follows—Calculated for $C_9H_{11}NO_3$: C, 59.6%; H, 6.10%; N, 7.73%. Found: C, 59.77%; H, 6.31%; N, 7.86%.

*Example 3.*—*Preparation of butyl 2-cyano-7-oxabicyclo [2.2.1]-heptane-3-carboxylate*

To 92.6 g. (0.5 mole) of 3,6-endoxohexahydrophthalamic acid and 675 ml. of dry methylene chloride was added 101.2 g. (1.0 mole) of triethylamine with stirring over 22 minutes at +1 to −3° C., followed by 25 ml. of methylene chloride rinse. Then 136.6 g. (1.0 mole) of butyl chloroformate was added with stirring over 55 min. at +1 to −3° C., followed by 25 ml. of methylene chloride rinse. The mixture was stirred below 0° C. for another 1.5 hours and then was allowed to rise to room temperature with stirring. The solid, 88.7 g. of triethylamine hydrochloride, was filtered off. The methylene chloride solvent was removed from the filtrate and the residue was taken up in 150 ml. of warm benzene from which another 44.5 g. of triethylamine hydrochloride was filtered off.

The solvent was removed and the residue (102.8 g.) was treated with ether. About 20 g. of solid in several crops was obtained which melted over wide ranges and was not identified. These may contain some by-product. After removal of the ether from the main solution, the residue could not be recrystallized so it was distilled to give 39.2 g. (35.1% conversion) of product, a white, waxy solid, B.P. 133–139° at 0.2 mm., M.P. 41.5–44.5° C.

*Analysis.*—Found/calc.: percent C, 64.09/64.5; percent H, 7.78/7.79; percent N, 6.45/6.28.

The infrared spectrum shows nitrile and ester bands and confirms the structure of the compound.

*Example 4.*—*Preparation of phenyl-2-cyano-7-oxabicyclo[2.2.1]heptane-3-carboxylate*

To a stirred chilled mixture of 92.6 g. (0.5 mole) of 3,6-endoxohexahydrophthalamic acid and 650 mil. of dry methylene chloride there was added 101.2 g. (1.0 mole) of triethylamine at 0 to −8° C. over 24 minutes followed by 156.6 g. (1.0 mole) of phenyl chloroformate over 47 minutes at +1 to −2° C. The mixture was stirred cold for several hours, then allowed to rise to room temperature. The solid (93.2 g. of triethylamine hydrochloride) was filtered off and the solvent was vacuumed off from the filtrate. The residue was taken up in 250 ml. of hot benzene and filtered from another 44.4 g. of triethylamine hydrochloride. The crude product precipitated from the filtrate. It was purified by recrystallization from benzene. A total of 57.4 g. (47.2% conversion) of product, M.P. 126–134° was obtained. The analytical sample melted at 132–133.5° C.

*Analysis.*—Found/calc.: Percent C, 68.77/69.1; percent H, 5.85/5.35; percent N, 5.23/5.75.

Following the details of Example 4, α-naphthyl chloroformate is reacted with 3,6-endoxohexahydrophthalamic acid to yield α-naphthyl 2-cyano-7-oxabicyclo[2.2.1]-heptane-3-carboxylate.

As indicated above, the compounds of this invention are useful for the control of plant growth by contacting plants with a phytotoxic amount of the compounds, and the compounds are of particular value as herbicides, both for pre-emergent and post-emergent herbicidal applications. The compounds of the invention will be used preferably as pre-emergent herbicides, however, for control of weeds and to kill undesired vegetation. The phytotoxic amounts at which the compounds may be used will vary from about 2 to 20 pounds per acre although 4 to 8 pounds per acre will be preferred. Such concentrations can be used to control unwanted growth without damaging or destroying crops. The lower rates can be used to retard weed growth and to impart other plant growth regulation properties. For complete kill, the higher rates will be used. The compounds may be formulated as dispersions in water or as dispersions or solutions in organic solvents. To prepare such dispersions and emulsions a suitable wetting agent may be added which aids in the preparation of the formulation and which also serves to help penetration of the compound into the plant and soil surfaces. Suitable water dispersion concentrates may be prepared with or without suspending agents by ball milling or other fine grinding techniques. Suspending agents will be selected from the various agents readily available, such as lignin sulfonates, bentonite, dilute solutions of methocel, and the like. Formulations may also be prepared as emulsion concentrates for dilution with water for field applications. These may be prepared by the use of suitable solvents such as xylene, heavy aromatic naphtha, isophorone with the addition of suitable emulsifying agents which are usually blends of various compounds having the proper ratios of oil and water solubility properties and which are stable in the presence of the compound. A typical emulsifiable concentrate is as follows:

| | Percent by weight |
|---|---|
| Ethyl 2 - cyano - 7-oxabicyclo[2.2.1] heptane-3-carboxylate | 6.8 |
| Xylene | 61.0 |
| Blend of alkylaryl polyether alcohols with organic sulfonates ("Triton" X–161) | 5.4 |
| Heavy aromatic naphtha | 26.8 |

Wettable powders may be prepared by direct grinding of the dry compound with a blend of suitable dispersing agents such as attapulgite, bentonite, kieselguhr, etc. It is desirable to grind such a blend in a hammer mill so that 99% will pass through a 325 mesh screen. Wettable powders may also be prepared by absorbing a solution of the compound in a solvent such as xylene or acetone on a powdered or granular clay such as attapulgite or diatomaceous earth. All wettable powder preparations should contain a dispersing agent such as a lignin sulfonate and a wetting agent such as an alkylaryl polyether glycol. An example of a suitable wettable powder formulation is as follows:

| | Percent by weight |
|---|---|
| Ethyl 2-cyano-7-oxabicyclo[2.2.1] heptane-3-carboxylate | 25 |
| Lignin sulfonate ("Marasperse" N) | 2 |
| Attaclay | 58 |
| Diatomaceous earth | 12 |
| Alkyl naphthalene sodium sulfonate ("Petro" WP) | 3 |

Any or all of the above preparations, but preferably liquid preparations, may be used in formulating granules of 1 to 20% composition of active herbicidal ingredient. Either may make applications employing a granular applicator rather than a duster or sprayer and known methods in commercial use are applicable for the preparation of granular formulations.

As indicated, the compounds are particularly useful in pre-emergent weed control applications on various crops. This method of weed control with a herbicide involves the application of the chemical to the soil some time prior to the emergence of the crop. The application can be conveniently made at the same time as the seeding operation and most commonly involves the use of a sprayer attachment to the planter which applies the diluted chemical on the soil surface immediately after covering the seed. Only a band of the seed row may be treated with the herbicide, or the whole area may be treated on a broadcast basis. The chemical may or may not be mixed with the first one or two inches of soil at the time of this application using a suitable rototiller type tool.

The pre-emergence herbicides as employed in this invention possess the necessary properties to be effective in field use. Ideally, it should be possible to place a chemical on the soil surface in the zone of germinating weed seeds which are usually above the zone in which the crop plant has been placed. The small weed seeds usually emerge from only the upper inch of soil. However, it is impossible under practical conditions to maintain a separation of the chemical and the crop seed and it is therefore necessary for the herbicide to be of a selective type which will control as many undesirable weeds as possible without significant injury to the crop. The requires fairly unique and highly specific properties in the chemical since many of the crop plants are related botanically to weed crops occurring in the same field. The compounds of this invention meet this requirement.

The herbicides of this invention have a wide spectrum of weed control which is desirable because most crops can be infested with many species of both grasses and broadleaved weeds. The pre-emergence herbicide chemicals of this invention are adapted for use on specific crop plants and show a high degree of tolerance to all varieties of the crop. This tolerance is shown on all types of soils and under various environmental conditions which can change the response of a crop to a chemical.

The compositions may also be used in post-emergence applications for weed control where the emerged crop is sufficiently resistant. These applications may be made particularly in the period between emergence and the first cultivation of the crop, but treatments may also be made at later times such as the so-called layby treatment after the last possible cultivation to inhibit weed growth up to the time of harvest.

Certain of these compositions may be used as harvest aid chemicals which will either desiccate or defoliate the green leaves on susceptible crops and also desiccate any weeds which may be present in order to facilitate the mechanical harvesting with a combine in the case of crops or a picker or stripper for such a crop as cotton.

It is also possible to use compositions in higher doses than normally used for the crop application for the purpose of sterilizing the soil of all plant growth. Seasonal control of weeds in areas such as industrial sites and roadsides, etc. may be freed of undesirable vegetation in this manner.

*Herbicidal evaluations.*—The compounds of the invention were evaluated for pre-emergence weed control properties by applying solutions, emulsion concentrates, or wettable powder preparations to the soil surface of flats in the greenhouse. These flats were planted prior to treatment with beets, peas, soybeans, flax, and with weed seeds of Amaranthus sp. (red root), *Chenopodium album* (lamb's-quarter), Setaria sp. (foxtail), Digitaria sp. (crabgrass), etc. Application of the chemical was made immediately after planting of the crop and weeds. The flats were then placed in the greenhouse and counts made of crop and weed emergence after a three to four week period.

The following tables and other data indicate the results obtained.

TABLE I.—PRE-EMERGENT HERBICIDAL ACTIVITY OF ETHYL 2-CYANO-7-OXABICYCLO[2.2.1]HEPTANE-3-CARBOXYLATE APPLIED AS A 10% BY WEIGHT SOLUTION IN DIACETONE ALCOHOL

| Rate/Acre, lbs. | Percent Weeds Killed | | Crop Tolerance (Percent Emergence) | | |
|---|---|---|---|---|---|
| | Foxtail | Amaranthus | Sugar Beets | Soybeans | Flax |
| 2.5 | 100 | 0 | 100 | 80 | 80 |
| 5.0 | 92 | 65 | 100 | 90 | 0 |
| 10.0 | 95 | 100 | 100 | 100 | 0 |

It is clear from the above table that foxtail and amaranthus weeds can be controlled without any damage to sugar beet emergence, and sugar beet growth was completely normal. Emergence of soybeans was good, but growth and development was somewhat slow.

Field testing of ethyl 2-cyano-7-oxabicyclo[2.2.1] heptane-3-carboxylate as a pre-emergent herbicide in the form of the wettable powder formulation given above against undesirable grasses (crabgrass) and weeds such as pigweed, wild buckwheat and smartweed shows excellent control of broadleaves and grasses at 8 lbs./acre without damage to a sugar beet crop. Good control is also obtained at 4 lbs./acre.

Greenhouse tests in plots as described above were also carried out with other compounds of the invention. The data follow:

TABLE II

| | Rate/Acre, lbs. | Percent Weeds Killed | | | Percent Crop Emergence | |
|---|---|---|---|---|---|---|
| | | Foxtail | Crabgrass | Lambsquarter | Sugar Beets | Cotton |
| Agent of Example 4 applied as 10% solution in acetone | 5 | 50 | 33 | 0 | 98 | 84 |
| | 10 | 96 | 50 | 25 | 90 | 48 |
| Agent of Example 3 applied as 10% dispersion in water | 5 | 90 | 33 | 0 | 100 | 100 |
| | 10 | 100 | 46 | 25 | 100 | 84 |
| Agent of Example 2 applied as 10% solution in methanol-diacetone alcohol mixture (2:1 by vol.) | 2 | 90 | 30 | 0 | 95 | 100 |
| | 4 | 96 | 57 | 36 | 100 | 85 |

The compounds of the invention are also useful as post-emergent herbicides and defoliants. For example, ethyl 2-cyano-7-oxabicyclo[2.2.1] heptane-3-carboxylate was applied as a 10% solution in diacetone alcohol to weeds which had been grown to a height of 4 to 8 inches and the results shown in the following table were obtained.

TABLE III.—APPLICATION OF THE COMPOUND OF EXAMPLE 1 TO WEEDS

| Rate/Acre, lbs. | Percent Kill of Weeds | | |
|---|---|---|---|
| | Foxtail | Crabgrass | Wild Oats |
| 5 | 100 | 80 | 20 |
| 10 | 100 | 95 | 60 |

In the above test the effect on the plants was such as to indicate a definite systemic reaction which permits translocation of the agent from the foliage to the stem where complete kill of the plant can be obtained.

As indicated, the compounds of the invention are also useful as defoliants. When snap or green beans in pots are sprayed with an aqueous suspension of the agent of Example 1 at a rate of 5 lbs./acre, 75% to 100% defoliation is obtained within two weeks time.

In other tests with the compound of Example 4, 60% desiccation of flax was obtained when the plant was treated at 10 lbs./acre with an acetone solution containing 10% by weight of the agent. Likewise the emulsifiable concentrate described above may be diluted with water to 10% by weight of active agent concentration before use and applied as a spray to give plant growth response effects.

It will be understood that numerous changes may be made from the above description and examples without departing from the spirit and scope of the invention.

I claim:
1. A compound of the structure

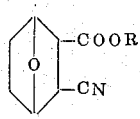

wherein R is hydrocarbon containing from one to ten carbon atoms selected from the group consisting of alkyl and aryl.

2. Methyl 2-cyano-7-oxabicyclo[2.2.1] heptane-3-carboxylate.

3. Ethyl 2-cyano-7-oxabicyclo[2.2.1] heptane-3-carboxylate.

4. Butyl 2-cyano-7-oxabicyclo[2.2.1] heptane-3-carboxylate.

5. Phenyl 2-cyano-7-oxabicyclo[2.2.1] heptane-3-carboxylate.

6. α-Naphthyl 2-cyano-7-oxabicyclo[2.2.1] heptane-3-carboxylate.

References Cited by the Examiner

UNITED STATES PATENTS

| | | | |
|---|---|---|---|
| 2,570,029 | 10/1951 | Fluchaire et al. | 260—78.4 |
| 2,576,082 | 11/1951 | Tischler et al. | 71—2.5 |
| 2,757,181 | 7/1956 | Clauson-Kaas | 260—347.5 |
| 2,834,789 | 5/1958 | Clauson-Kaas | 260—347.5 |
| 2,957,906 | 10/1960 | Erickson et al. | 260—347.5 X |
| 3,018,175 | 1/1962 | Cameron | 71—2.5 |

NICHOLAS S. RIZZO, *Primary Examiner.*

JULIAN S. LEVITT, HENRY R. JILES, *Examiners.*

JAMES O. THOMAS, *Assistant Examiner.*